__United States Patent__ [19]

Vogel et al.

[11] 4,376,067

[45] Mar. 8, 1983

[54] CATALYTIC SUPPORTS WITH CONTROLLED PORE PROPERTIES

[75] Inventors: Roger F. Vogel, Butler; George Marcelin, Pittsburgh, both of Pa.

[73] Assignee: Gulf Research & Development Company, Pittsburgh, Pa.

[21] Appl. No.: 289,539

[22] Filed: Aug. 3, 1981

[51] Int. Cl.$^3$ .................. B01J 23/02; B01J 23/06; B01J 27/18
[52] U.S. Cl. ................................................... 252/437
[58] Field of Search ............................. 252/435, 437

[56] References Cited

U.S. PATENT DOCUMENTS 4,210,560  7/1980  Kehl .................................. 252/437

*Primary Examiner*—W. J. Shine
*Attorney, Agent, or Firm*—Deane E. Keith; Forrest D. Stine; Joseph J. Carducci

[57] ABSTRACT

A catalyst support suitable for use in a cracking process or hydrotreating process having outstanding thermal stability comprising (I) a selected Group IIB metal compound, combinations thereof, and combinations of Group IIB and Group IIA metal compounds, (II) alumina and (III) aluminum phosphate.

12 Claims, No Drawings

CATALYTIC SUPPORTS WITH CONTROLLED PORE PROPERTIES

BACKGROUND OF THE INVENTION

1. Field of the Invention

The present invention resides in catalytic supports. Particularly, the invention teaches catalytic supports which can be combined with metals suitable for use in either a fluid cracking process or a hydrotreating process.

The catalyst supports herein, when formulated with the requisite metals, are particularly formulated to increase the gasoline yield and quality (i.e., BTX) from gas oils during a cracking process and additionally to catalytically crack petroleum residuals with high selectivity to gasoline production as well as having improved metals tolerance characteristics. Examples of typical metals which can be present during the cracking and/or hydrotreating process include: nickel, vanadium, copper, chromium, iron, cobalt, tungsten, molybdenum, and inorganic oxides, such as the zeolites, etc.

2. Description of the Prior Art

In U.S. Pat. No. 4,210,560, dated July 1, 1980, there is disclosed and claimed a catalyst support which can be utilized in a fluid catalyst cracking process or a hydrotreating process, depending upon the type metals formulated with the support, comprising a magnesia-alumina-aluminum phosphate matrix characterized after calcination at 500° C. for 10 hours as amorphous, and having an average pore radius of from about 10 Å to about 300 Å, preferably from about 75 Å to about 200 Å; a surface area ranging from about 100 m²/g to about 350 m²/g, especially from about 125 m²/g to about 250 m²/g; a pore volume of from about 0.3 cc/g to about 1.5 cc/g, preferably from about 0.7 cc/g to about 1.2 cc/g; wherein the magnesia-alumina-aluminum phosphate matrix has a mole percent ratio of from about 10:80:10 to about 25:10:65, especially from about 10:55:35 to about 20:35:45, and wherein said matrix retains at least 90 percent of its surface area when the matrix is additionally calcined at a temperature up to about 750° C. for about 10 hours.

SUMMARY OF THE INVENTION

We have now discovered that catalyst supports similar to those defined and claimed in said U.S. Pat. No. 4,210,560, but wherein the magnesia component thereof is replaced with (I) a Group IIB metal compound selected from the group consisting of zinc and cadmium compounds, (II) a combination of said zinc and cadmium compounds or (III) a combination of at least one of said Group IIB metal compounds with at least one Group IIA metal compound selected from the group consisting of magnesium, calcium, strontium, and barium compounds will also have properties similar thereto. Accordingly, the invention defined and claimed herein resides in a catalyst support comprising (A)(I) a Group IIB metal compound selected from the group consisting of zinc and cadmium compounds, (II) a combination of said zinc and cadmium compounds or (III) a combination of at least one of said Group IIB metal compounds with at least one Group IIA metal compound selected from the group consisting of magnesium, calcium, strontium and barium compounds; (B) alumina and (C) aluminum phosphate. The support is characterized, after calcination at 500° C. for about 10 hours as amorphous, as having an average pore radius of from about 10 Å to about 300 Å, preferably from about 75 Å to about 200 Å, a surface area ranging from about 80 m²/g to about 350 m²/g, especially from about 125 m²/g to about 250 m²/g; a pore volume of from about 0.3 cc/g to about 1.5 cc/g, preferably from about 0.5 cc/g to about 1.2 cc/g; wherein said Group IIB metal compound alumina-aluminum phosphate matrix contains said Group IIB metal compound in an amount ranging from about 0.5 to about 75 mole percent, preferably from about two to about 70 mole percent, alumina in an amount ranging from about two to about 90 mole percent, preferably from about eight to about 80 mole percent, and aluminum phosphate in an amount ranging from about three to about 95 mole percent, preferably from about five to about 80 mole percent.

DESCRIPTION OF THE INVENTION

As pointed out above, the present invention resides in catalytic supports. The supports herein can conveniently be used in fluid catalyst cracking processes and hydrotreating processes. One such process is set forth in U.S. Pat. No. 4,179,358, dated Dec. 18, 1979, of Swift et al, the disclosure of which is incorporated herein by reference.

The catalyst support herein in a preferred embodiment is a Group IIB metal oxide-alumina-aluminum phosphate matrix of the formula:

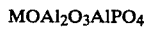

$MOAl_2O_3AlPO_4$ wherein M is a Group IIB metal selected from the group consisting of zinc and cadmium. As pointed out above, it is understood that M can also stand for a combination of said Group IIB metals (zinc or cadmium) as well as a combination of zinc and/or cadmium with at least one Group IIA metal. Preferred combinations of Group IIB and Group IIA metals are zinc and magnesium and zinc and calcium. When more than one of said Group IIB metals is present, they can be present in any desired ratios. When one or more of said Group IIA metals are present with one or more of said Group IIB metals, said Group IIA metal or metals can be present in an amount up to about 90 weight percent based on the total Group II metals present. In any event, the Group IIB metal compound or compounds can be present in an amount ranging from about 0.5 to about 75 mole percent, preferably from about two to about 70 mole percent, alumina in an amount ranging from about two to about 90 mole percent, preferably from about eight to about 80 mole percent, and aluminum phosphate in an amount ranging from about three to about 95 mole percent, preferably from about five to about 80 mole percent.

It is emphasized that the Group IIB metal oxide-alumina-aluminum phosphate matrix herein is characterized after calcination at 500° C. for about 10 hours, as amorphous and having an average pore radius of from about 10 Å to about 300 Å, preferably from about 75 Å to about 200 Å; a surface area ranging from about 80 m²/g to about 350 m²/g, preferably from about 125 m²/g to about 250 m²/g; and a pore volume of from about 0.3 cc/g to about 1.5 cc/g, preferably from about 0.5 cc/g to about 1.2 cc/g.

The Group IIB metal oxide-alumina-aluminum phosphate catalyst supports herein can be conveniently prepared by admixing together an aqueous solution of aluminum nitrate with an aqueous solution of the appropriate Group IIB nitrate, for example, zinc and/or cadmium nitrate, and 85 percent aqueous phosphoric acid. If a group IIA metal oxide is also desired in the final support, an aqueous solution of the appropriate Group IIA nitrate, for example, one or more of the nitrates of magnesium, calcium, strontium and barium are also present. The Group IIB metal oxide alumina-aluminum phosphate catalyst support precursor can be conveniently precipitated from solution by the addition of ammonium hydroxide, while maintaining the solution pH in the range of about 5 to about 10. It should be noted that the pore size of the catalyst support can be controlled by varying the pH of the solution. In preparing the novel Group IIB metal oxide-alumina-aluminum phosphate support herein the Group IIB nitrate, and Group IIA, if present, aluminum nitrate and phosphoric acid are used in molar amounts stoichiometrically corresponding to the amounts of Group IIB metal (and Group IIA, if present), aluminum and phosphate components present in the desired support.

After the Group IIB metal oxide-alumina-aluminum phosphate precursor is filtered from solution it is dried at about 120° C. and calcined at about 500° C. for about 10 hours using conventional apparatus to obtain the desired Group IIB metal oxide-alumina-aluminum phosphate support. The matrix was examined after calcination and was found to be amorphous.

It is to be noted that the catalyst supports herein can conveniently be admixed with zeolites to produce cracking catalysts which provide for an improved process for increasing gasoline yield and quality of either light or heavy feedstocks which can additionally contain a high metals content.

Typical zeolites or molecular sieves having cracking activity and which can be suitably dispersed in a matrix for use as a catalytic cracking catalyst are well known in the art. Suitable zeolites are described, for example, in U.S. Pat. No. 3,660,274 to James J. Blazek et al. The description of the crystalline aluminosilicates in the Blazek et al patent is incorporated herein by reference. Synthetically prepared zeolites are initially in the form of alkali metal aluminosilicates. The alkali metal ions are exchanged with rare earth metal ions to impart cracking characteristics to the zeolites. The zeolites are, of course, crystalline, three-dimensional, stable structures containing a large number of uniform openings or cavities interconnected by smaller, relatively uniform holes or channels. The effective pore size of synthetic zeolites is suitably between 6 Å and 15 Å in diameter. The overall formula for the zeolites can be represented as follows:

$$xM_{2/n}O:Al_2O_3:1.5-6.5SiO_2:SiO_2:yH_2O$$

where M is a metal cation and n its valence and x varies from 0 to 1 and y is a function of the degree of dehydration and varies from 0 to 9, M is preferably a rare earth metal cation such as lanthanum, cerium, praseodymium, neodymium, etc., or mixtures of these.

Zeolites which can be employed in combination with this invention include both natural and synthetic zeolites. These zeolites include gmelinite, chabazite, dachiardite, clinoptilolite, faujasite, heulandite, analcite, levynite, erionite, sodalite, cancrinite, nepheline, lazurite, scolecite, natrolite, offretite, mesolite, mordenite, brewsterite, ferrierite, and the like. The faujasites are preferred. Suitable synthetic zeolites which can be treated in accordance with this invention include zeolites X, Y, A, L, ZK-4, B, E, F, HJ, M, Q, T, W, Z, alpha and beta, ZSM-types and omega. The term "zeolites" as used herein contemplates not only aluminosilicates but substances in which the aluminum is replaced by gallium and substances in which the silicon is replaced by germanium.

The preferred zeolites for use in combination with this invention are the synthetic faujasites of the types Y and X or mixtures thereof; however, the Y-type zeolites are superior when used herein.

It is to be noted that some X-type zeolite will be mixed with the Y-type zeolite due to the difficulty and cost involved in separating the two zeolites. It is additionally noted that the presence of small amounts of the X-type zeolite will not substantially impair the superior selectivity to gasoline production of the catalysts herein.

It is also well known in the art that to obtain good cracking activity the zeolites have to be in a proper form. In most cases this involves reducing the alkali metal content of the zeolite to as low a level as possible. Further, a high alkali metal content reduces the thermal structural stability, and the effective lifetime of the catalyst will be impaired as a consequence thereof. Procedures for removing alkali metals and putting the zeolite in the proper form are well known in the art as described in U.S. Pat. No. 3,537,816.

The crystalline aluminosilicate zeolites, such as synthetic faujasite, will under normal conditions, crystallize as regularly shaped, discrete particles of approximately one to ten microns in size, and, accordingly, this is the size range normally used in the commercial catalysts. Preferably the particle size of the zeolites is from 0.5 to 10 microns and more preferably is from 1 to 2 microns or less. Crystalline zeolites exhibit both an interior and an exterior surface area, with the largest portion of the total surface area being internal. Blockage of the internal channels by, for example, coke formation and contamination by metals poisoning will greatly reduce the total surface area. Therefore, to minimize the effect of contamination and pore blockage, crystals larger than the normal size cited above are preferably not used in the catalysts of this invention.

The term REY-zeolites as defined herein is the Y-type zeolite that has undergone an ion exchange reaction with rare earth metal ions. The naturally occurring molecular sieve zeolites are usually found in the sodium form, an alkaline earth metal form, or mixed forms. The synthetic molecular sieves are normally in their sodium form, however, it should be understood that other alkali metal compounds can be substituted therefor. In their sodium form, the Y zeolites suitable for use herein correspond to the general formula:

$$0.9\pm0.2NaO:Al_2O_3:nSiO_2:xH_2O$$

wherein n is an integer of from about 3 to about 6 and x is an integer of from about 0 to about 9. It is to be noted that after the ion exchange reaction with the rare earth metals, the sodium content of the Y zeolite is from about 0.3 to about 1 molar percent, especially from about 0.5 to about 0.8 molar percent. When sodium is present above this molar range, it tends to deactivate the catalyst and to reduce the sodium content below 0.3 molar percent is too expensive to justify.

Rare earth metals can conveniently be substituted for the sodium in the Y zeolite above using conventional techniques and methods. A wide variety of rare earth compounds can be ion exchanged with the above sodium ions. Operable compounds include rare earth chlorides, bromides, iodides, carbonates, bicarbonates, sulfates, sulfides, thiocyanates, peroxysulfates, acetates, benzoates, citrates, fluorides, nitrates, formates, propionates, butyrates, valecates, lactates, malanates, oxalates, palmitates, hydroxides, tartrates and the like. The preferred rare earth salts are the chlorides, nitrates and sulfates. It is to be noted that the only limitation on the particular rare earth metal salt or salts employed is that it be sufficiently soluble in the ion exchange fluid medium in which it is used to give the necessary rare earth ion transfer.

Representative of the rare earth metals are cerium, lanthanum, praseodymium, neodymium, illinium, samarium, europium, gadolinium, terbium, dysprosium, holmium, erbium, thulium, scandium, yttrium, and lutecium.

The rare earth metal salts employed can either be the salt of a single rare earth metal or mixtures of rare earth metals, such as rare earth chlorides of didymium chloride. As hereinafter referred to, unless otherwise indicated, a rare earth chloride solution is a mixture of rare earth chlorides consisting essentially of the chlorides of lanthanum, cerium, neodymium and praseodymium with minor amounts of samarium, gadolinium and yttrium, Rare earth chloride solutions are commercially available and the ones specifically referred to in the examples contain the chlorides of the rare earth mixture having the relative composition cerium (as $CeO_2$) 48 percent by weight, lanthanum (as $La_2O_3$) 24 percent by weight, praseodymium (as $Pr_6O_{11}$) 5 percent by weight, neodymium (as $Nd_2O_3$) 17 percent by weight, samarium (as $Sm_2O_3$) 3 percent by weight, gadolinium (as $Gd_2O_3$) 2 percent by weight, and other rare earth oxides 0.8 percent by weight. Didymium chloride is also a mixture of rare earth chlorides but having a lower cerium content. It consists of the following rare earths determined as oxides: lanthanum 45-65 percent by weight, cerium 1-2 percent by weight, praseodymium 9-10 percent by weight, neodymium 32-33 percent by weight, samarium 5-7 percent by weight, gadolinium 3-4 percent by weight, yttrium 0.4 percent by weight, and other rare earths 1-2 percent by weight. It is to be understood that other mixtures of rare earths are also applicable for use in combination with the catalytic supports of this invention, although lanthanum, neodymium, praseodymium, samarium and gadolinium as well as mixtures of rare earth cations containing a predominant amount of one or more of the above cations are preferred since these metals provide optimum activity for hydrocarbon conversion, including catalytic cracking.

It should be noted that the zeolites when admixed with the catalyst supports herein are normally composited therewith from about 5 to about 50 weight percent, preferably from about 5 to about 35 weight percent based on the weight of said catalyst support.

The matrix or catalyst support herein can additionally be used in combination with metals normally used in a hydrotreating process, for example, in a desulfurization and/or denitrogenation process.

DESCRIPTION OF PREFERRED EMBODIMENTS

EXAMPLE I

A catalyst support comprising a zinc oxide-alumina-aluminum phosphate matrix was prepared according to the following procedure.

A first solution was prepared by dissolving 281.2 grams of aluminum nitrate [$Al(NO_3)_3.9H_2O$] in one liter of distilled water. A second solution was prepared by dissolving 74.89 grams of zinc nitrate hexahydrate in one liter of distilled water. The two solutions must be clear. Next, the two solutions were combined and 28.6 grams of 85 percent aqueous phosphoric acid were added and the resulting solution was well mixed. Approximately one liter of distilled water was prepared to provide a stirring medium. A stock solution of ammonium hydroxide was diluted with distilled water (ratio=1:1). The stock solution of ammonium hydroxide and previously mixed solution were slowly added from separate burets to a mixing vessel containing the stirred medium electric stirrer and pH electrodes. The solution pH of the stirring medium was maintained at 9.0 by adjusting the flow rates of the two burets. Vigorous stirring was maintained throughout the mixing period. A white precipitate formed which was recovered from solution by filtration. The filter cake, thus recovered, was washed with ten liters of distilled water and dried in an electrically heated oven at 120° C. Next the filter cake was calcined in heated air at 500° C. for 10 hours. The pore properties of the calcined sample were measured by a standard nitrogen adsorption procedure based on the Brunauer, Emmett & Teller method, as modified by Barrett, E. P., Joyner, L. G. and Halenda, P. P., J.A.C.S., 73, p. 373 (1951), the results of which are shown below in Table I.

EXAMPLE II

The procedure of Example I was followed, except that there were used 375 grams of aluminum nitrate [$Al(NO_3)_3.9H_2O$], 91.5 grams of 85 percent aqueous phosphoric acid and 59.5 grams of zinc nitrate hexahydrate.

The data from Example II are also summarized below in Table I.

TABLE I

| Example No. | I | | II | |
|---|---|---|---|---|
| Components of Support, Mole Percent | | | | |
| Group IIB Metal Oxide | Zn, | 33 | Zn, | 10 |
| Alumina | | 33 | | 10 |
| Aluminum Phosphate | | 34 | | 80 |
| Pore Data | | | | |
| Median Pore Radius, Å | | 135 | | 168.4 |
| Pore Volume, cc/g | | 0.79 | | 0.55 |
| Average Pore Radius, Å | | 95.2 | | 99.3 |
| Surface Area, m²/g | | 165.1 | | 109.9 |
| Pore Size Distribution | | | | |
| 200–300 Å Radius | | 20.8 | | 35.9 |
| 100–200 Å Radius | | 47.8 | | 41.8 |
| 50–100 Å Radius | | 24.0 | | 15.7 |
| 40–50 Å Radius | | 2.9 | | 2.3 |
| 30–40 Å Radius | | 3.1 | | 2.4 |
| 20–30 Å Radius | | 1.5 | | 2.1 |
| <20 Å Radius | | 0 | | 0 |

EXAMPLE III

A representative REY-zeolite catalyst can be prepared as follows. First, an REY-zeolite can be prepared following the procedure in Example X in said U.S. Pat. No. 4,210,560 referred to above. Then the matrix obtained in either Example I or Example II herein can be slurried and added to the REY-zeolite so produced, after which the slurry can be spray dried and calcined for 10 hours at 500° C. to produce the desired REY-zeolite catalyst. The REY-zeolite content of the resulting catalyst can be in a range of about five to about 30 weight percent, preferably about 15 weight percent.

Obviously, many modifications and variations of the invention, as hereinabove set forth, can be made without departing from the spirit and scope thereof, and therefore only such limitations should be imposed as are indicated in the appended claims.

We claim:

1. A catalyst support comprising (A)(I) a Group IIB metal compound selected from the group consisting of zinc and cadmium compounds, (II) a combination of said zinc and cadmium compounds or (III) a combination of at least one of said Group IIB metals compounds with at least one Group IIA metal compound selected from the group consisting of magnesium, calcium, strontium and barium compounds; (B) alumina and (C) aluminum phosphate matrix, characterized after calcination at 500° C. for about 10 hours as amorphous, and having an average pore radius of from about 10 Å to about 300 Å, a surface area ranging from about 80 m$^2$/g to about 350 m$^2$/g, a pore volume of from about 0.3 cc/g to about 1.5 cc/g and wherein component (A) is present in an amount ranging from about 0.5 to about 75 mole percent, component (B) is present in an amount ranging from about two to about 90 mole percent and component (C) is present in an amount ranging from about three to about 95 mole percent.

2. The catalyst support of claim 1 wherein said matrix has an average pore radius of from about 75 Å to about 200 Å, a surface area of from about 125 m$^2$/g to about 250 m$^2$/g, a pore volume of from about 0.5 cc/g to about 1.2 cc/g and wherein component (A) is present in an amount ranging from about two to about 70 mole percent, component (B) is present in an amount ranging from about eight to about 80 mole percent and component (C) is present in an amount ranging from about five to about 80 mole percent.

3. The catalyst support of claim 1 wherein component (A) is zinc oxide.

4. The catalyst support of claim 2 wherein component (A) is zinc oxide.

5. The catalyst support of claim 1 wherein component (A) is cadmium oxide.

6. The catalyst support of claim 2 wherein component (A) is cadmium oxide.

7. The catalyst support of claim 1 wherein component (A) is composed of zinc oxide and cadmium oxide.

8. The catalyst support of claim 2 wherein component (A) is composed of zinc oxide and cadmium oxide.

9. The catalyst support of claim 1 wherein component (A) is composed of zinc oxide and magnesium oxide.

10. The catalyst support of claim 2 wherein component (A) is composed of zinc oxide and magnesium oxide.

11. The catalyst support of claim 1 wherein component (A) is composed of zinc oxide and calcium oxide.

12. The catalyst support of claim 2 wherein component (A) is composed of zinc oxide and calcium oxide.

* * * * *